United States Patent [19]

Charneski et al.

[11] Patent Number: 5,680,594
[45] Date of Patent: Oct. 21, 1997

[54] ASIC BUS INTERFACE HAVING A MASTER STATE MACHINE AND A PLURALITY OF SYNCHRONIZING STATE MACHINES FOR CONTROLLING SUBSYSTEMS OPERATING AT DIFFERENT CLOCK FREQUENCIES

[75] Inventors: David Charneski, Hilton; Kenneth D. Kieffer, Rochester; John J. Uebelacker, Rochester; Richard A. Wanzenried, Rochester, all of N.Y.

[73] Assignee: Eastman Kodak Company, Rochester, N.Y.

[21] Appl. No.: 448,719

[22] Filed: May 24, 1995

[51] Int. Cl.[6] .................................................. G06F 15/20
[52] U.S. Cl. ..................... 395/556; 395/551; 395/553; 395/559
[58] Field of Search ........................ 395/160, 558; 327/114

[56] References Cited

U.S. PATENT DOCUMENTS

| | | | |
|---|---|---|---|
| 4,523,274 | 6/1985 | Fukunaga et al. | 364/200 |
| 4,670,837 | 6/1987 | Sheets | 364/200 |
| 4,819,164 | 4/1989 | Branson | 364/200 |
| 5,197,126 | 3/1993 | Harrell | 395/200 |
| 5,265,243 | 11/1993 | Povenmire et al. | 395/550 |
| 5,280,587 | 1/1994 | Shimodaira et al. | 395/275 |
| 5,319,772 | 6/1994 | Hwang | 395/550 |
| 5,347,559 | 9/1994 | Hawkins et al. | 377/54 |
| 5,359,727 | 10/1994 | Kurita et al. | 395/550 |
| 5,535,398 | 7/1996 | Biggs et al. | 395/750 |

*Primary Examiner*—Thomas C. Lee
*Assistant Examiner*—David Ton
*Attorney, Agent, or Firm*—David M. Woods

[57] ABSTRACT

A bus interface device for an application specific integrated circuit handles more than two different clock frequencies and allow for real time switching between the clock frequencies by subsystems of the application specific integrated circuit. In a preferred embodiment, a master state machine is provided that includes a plurality of control input lines and a plurality of control output lines, and a plurality of synchronizing state machines each coupled to one of the control output lines of the master state machine and to a separate clock frequency line. The master state machine, based on signals applied to the control input lines, selectively enables the synchronizing state machines to supply the different clock frequencies to the subsystems of the application specific integrated circuit.

3 Claims, 2 Drawing Sheets

ASIC BUS INTERFACE HAVING A MASTER STATE MACHINE AND A PLURALITY OF SYNCHRONIZING STATE MACHINES FOR CONTROLLING SUBSYSTEMS OPERATING AT DIFFERENT CLOCK FREQUENCIES

FIELD OF THE INVENTION

The invention relates in general to interface devices for microprocessor based systems. More specifically, the invention relates to an application specific integrated circuit for use in a camera system including a bus interface circuit that allows for real time switching between multiple clock frequencies.

BACKGROUND OF THE INVENTION

An interface device is provided in most microprocessor based systems to interface the microprocessor to a peripheral device. The interface device is used to synchronize commands and data generated by the microprocessor to the peripheral device. The peripheral device may include an application specific integrated circuit (ASIC) that is designed to perform one or more specific functions in a particular apparatus. ASIC devices are commonly employed, for example, to control the operations of digital camera systems. A digital camera ASIC (DCA) includes a block of circuitry called an ASIC bus interface (ABI) that has a primary function of acting as a communication interface between the microprocessor and the control functions of the DCA. The ABI generates internal address, data and control signals that are synchronous to system clocks required by numerous subsystems or logical function blocks within the DCA. The input signals supplied to the ABI from the microprocessor include address, data and control signals that are synchronous to the microprocessor clock. The microprocessor clock may be at the same frequency or a different frequency than the various sub-system clocks on the DCA. The ABI synchronizes the communication between the microprocessor and the DCA, particularly when the two devices are operating at different clock frequencies, to insure no data is lost in transactions therebetween.

Current ABIs can handle the synchronization of single frequency systems, i.e., when the microprocessor and peripheral are operating at the same frequency, and can usually handle situations when the microprocessor and peripheral are operating on two different frequencies. The current ABIs, however, cannot be utilized in situations where it is desirable to provide a periphery device such as a DCA, having multiple subsystems or logical function blocks that are operable at multiple clock frequencies. Accordingly, it would be desirable to provide an ABI that can handle more than two different clock frequencies and allow for real time switching between the multiple clock frequencies.

SUMMARY OF THE INVENTION

The invention provides a bus interface device for an application specific integrated circuit that can handle more than two different clock frequencies and allow for real time switching between the clock frequencies by subsystems of the application specific integrated circuit. In a preferred embodiment, the bus interface device includes a master state machine having a plurality of control input lines and a plurality of control output lines, a plurality of synchronizing state machines, each including a control input line coupled to one of the control output lines of the master state machine and at least one output select line, and a clock generator for supplying a different clock frequency signal to each of the synchronizing state machines.

The master state machine selectively enables the synchronizing state machines in response to control signals applied to the control input lines of the master state machine. A plurality of subsystems operable at different clock frequencies are coupled to the synchronizing state machines. The clock generator also supplies a clock frequency signal to each subsystem that corresponds to the clock frequency signal supplied to the synchronizing state machine corresponding thereto. The operating frequency of the subsystems can be changed through the use of a control register located within the subsystem.

BRIEF DESCRIPTION OF THE DRAWINGS

The invention will be described in greater detail with reference to the accompanying drawings wherein.

DETAILED DESCRIPTION OF THE PREFERRED EMBODIMENTS

Figure 1:
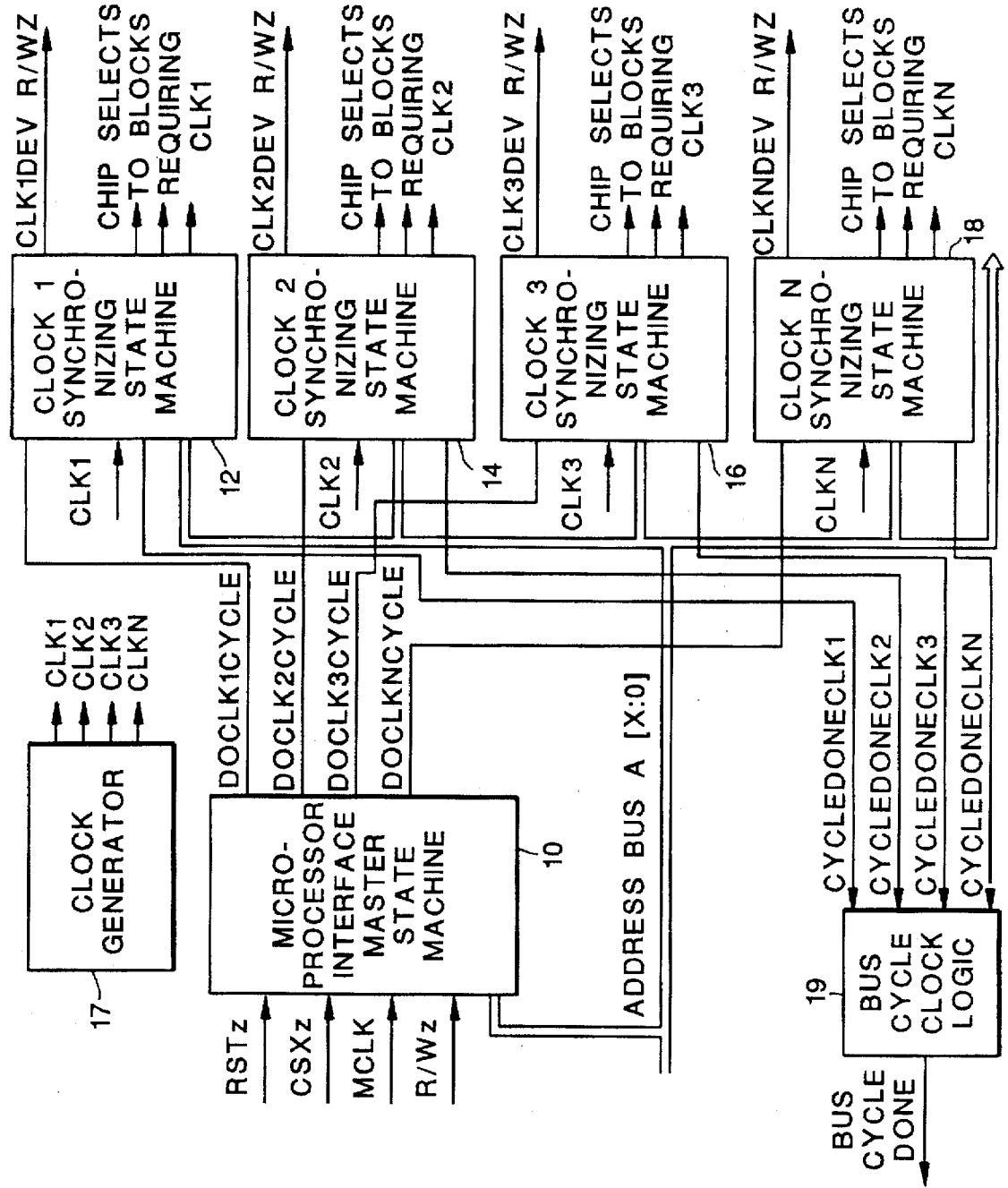
FIG. 1 is a schematic block diagram of an ABI in accordance with the invention.

A detailed schematic block diagram of an ABI in accordance with the invention is shown in FIG. 1. The ABI has a structure that allows for multiple clock frequencies within an ASIC incorporating the ABI and real time switching of the multiple clock frequencies. Specifically, the ABI includes address lines A[X:0], a read/write control line (R/Wz), a chip select control line (CSXz), a reset control line (RSTz) and a microprocessor clock signal line (MCLK) that are coupled to a microprocessor (not shown). A signal applied to the CSXz line of the ABI is used to select the ABI, and therefore the device incorporating the ABI, as the device to be interfaced to the microprocessor. The R/Wz line receives a signal that defines whether a read or write operation is to be performed. A read operation is performed when a high logic level signal is applied to the R/Wz line and a write operation is performed with a low logic level signal is applied to the R/Wz line. The R/Wz line allows the master state machine 10 to be initialized to a known operating state. Enable signals from the master state machine 10 (DOCLK1CYCLE to DOCLKNCYCLE, where N is the number of different clock frequencies required within the ASIC incorporating the ABI) are used to selectively enable a plurality of synchronizing state machines 12-18, each of which is supplied with a separate clock frequency from a clock generator 17 via clock frequency lines CLK1-CLKN. The enable signals enable one and only one of the synchronizing state machines 12-18 at a time, depending on which subsystem or function block within the ASIC incorporating the ABI is to be activated.

During operation, the master state machine 10 decodes signals applied to the address lines A[X:0] and chip select line (CSXz) to determine which subsystem or function block is to be activated. For example, if the microprocessor needs to write to a register contained within a particular subsystem or logical function block, the microprocessor sends an address corresponding to the register, applies the appropriate signals to R/Wz and CSXz lines to indicate a write operation and select the ABI, and then sends the data to be written to the register. The master state machine 10 in the ABI decodes the address and chip select signals received from the microprocessor and determines which register in which subsystem or function block is to be written to during the write operation. The master state machine 10 is preset with information regarding the clock frequency that each subsystem or function block uses and enables the synchronizing state machine corresponding to the clock frequency. For example if CLK2 is required, the master state machine 10 enables the synchronizing state machine 14 which is associated with the CLK2 signal in the illustrated embodiment. The enabled synchronizing state machine then generates the proper read/write signal (r/wz) and chip select signal for the subsystem or function block corresponding thereto. Completion of a bus cycle is indicated by a BUSCYCLEDONE signal generated by bus cycle clock logic 19 in accordance with signals received from the synchronizing state machines 12–18.

Each subsystem or function block preferably has a default clock frequency to which it is initialized. The clock frequency can be changed, in a preferred embodiment of the invention, by writing to a read/write default clock register provided within each subsystem or logical function block. The ability to change clock frequencies is particularly important in applications requiring low power consumption, as the power consumed by an ASIC implemented in a CMOS silicon fabrication process is a function of operating frequency. Thus, in many applications, it is desirable to switch to a low frequency mode of operation to conserve power when high frequency operation is not required.

Figure 2:
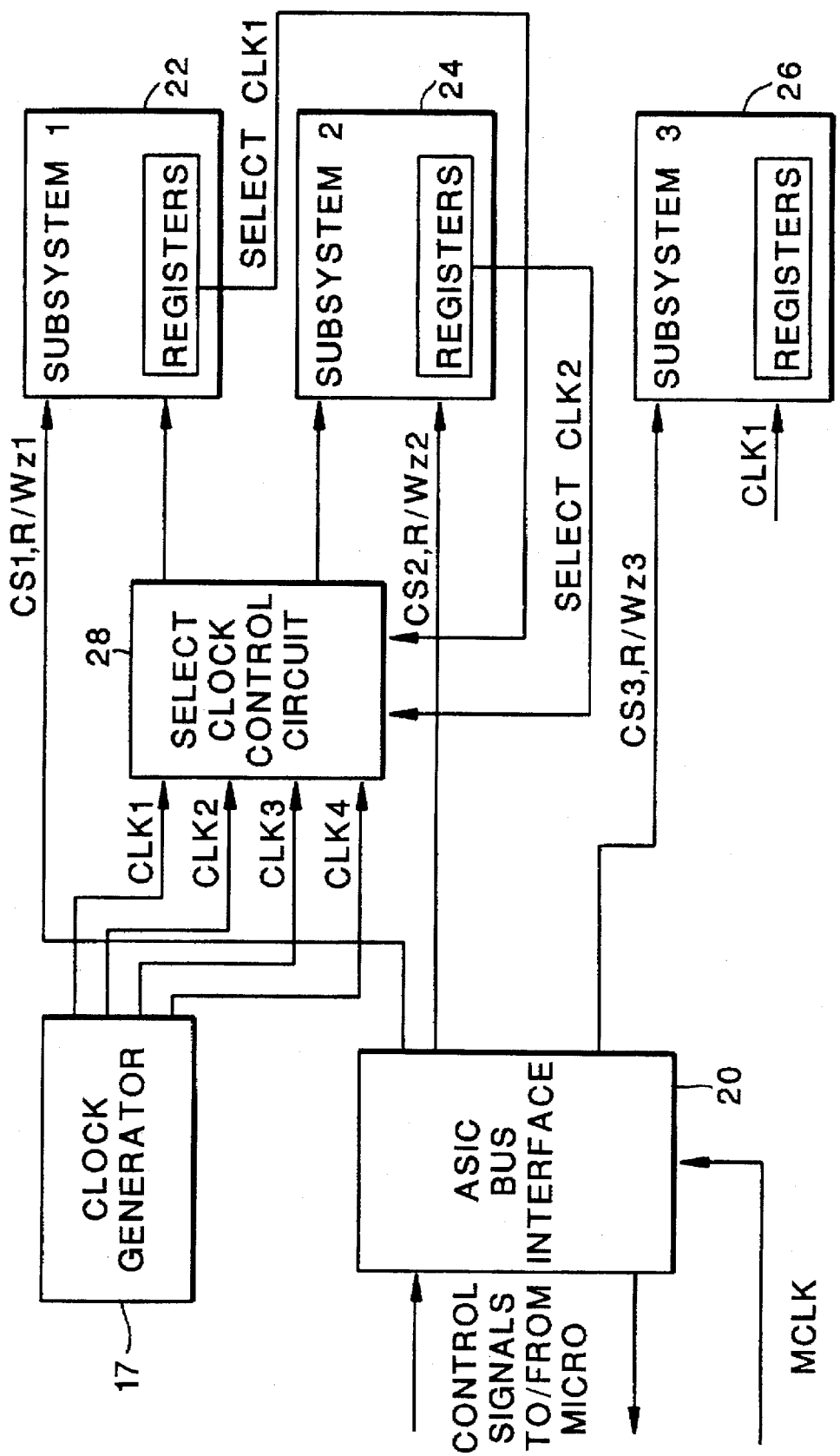
FIG. 2 is a schematic block diagram of a DCA incorporating the ABI illustrated in FIG. 1.

FIG. 2 illustrates a DCA for a battery powered imaging system where low power, low cost and good image quality are critical. The DCA includes an ABI 20 of the type illustrated in FIG. 1. The DCA further includes three subsystems (Subsystem 1-3), each of which has its own read/write register 22-26. While only three subsystems are shown for simplicity of illustration, it will be understood that the ABI 20 can support any number of subsystems with any number of required clock frequencies. The Subsystem 1 requires two different clock frequencies (CLK1, CLK2) depending on its mode of operation. It will be assumed that the default clock frequency for Subsystem 1 is CLK1 and that, during operation, the clock frequency needs to change to a different operating frequency in order to conserve power. To accomplish the clock frequency change, a select-Clk1 bit must be written to the read/write register 22 of Subsystem 1, as the output of the read/write register 22 is used to control the operation of a clock multiplexer control circuit 28. Specifically, Subsystem 1 is switched to operating on the CLK2 frequency by changing the state of the select-CLK1 signal supplied to the clock multiplexer control circuit 28. Any further communication with the Subsystem 1 is then accomplished at the CLK2 frequency. A similar operation can be performed to select two entirely different clock frequencies (CLK3, CLK4) for Subsystem 2, by supplying a selectCLK2 signal to the clock multiplexer control circuit 28 from the read/write register 24 of Subsystem 2. Other subsystems, such as Subsystem 3, can be supplied with one operating frequency in a conventional manner. The switching of the clock frequency is accomplished in real time and the data and control signals are all synchronized in the ABI 20. In the illustrated example, the chip select (CS1) and read/write (r/wz1) control signals would be supplied to the Subsystem 1 by the synchronizing state machines 12, 14 associated with the CLK1 and CLK2 signals.

The ABI of the present invention provides a number of advantages over conventional interface approaches. For example, the utilization of multiple state machines controlled by a master state machine permits different subsystems or function blocks within the ASIC to be operated at more than two different frequencies. In addition, the operating frequency for each of the subsystems can be easily switched in real time, which is particularly advantageous in reducing power requirements in CMOS ASICs. The switching of the subsystems operating frequencies is cost effectively implemented by including a read/write control register within each of the subsystems, as opposed to the use of a central register location found in conventional peripheral interface devices. The use of separate registers provides additional advantages. For example, when real time switching of clock frequencies is needed, the control signals only need to be re-synchronized in the ABI, as opposed to requiring re-synchronization in the ABI and once in the register section of each subsystem. Access time to the registers is therefore improved by requiring only one synchronization step. By separating the registers from the ABI and only synchronizing the control signals to the registers, as opposed to the actual register, a minimum gate size can be achieved. This also allows for optimal signal routing within the ASIC, which reduces required die size and cost and increase performance.

The invention has been described with reference to certain preferred embodiments thereof. It will be understood, however, that modifications and variation are possible within the scope of the appended claims.

Industrial Utility

The invention provides an interface circuit that can be utilized to interface a microprocessor to any type of peripheral device. The invention is particularly useful, however, in applications in which a microprocessor is interfaced to a digital camera application specific integrated circuit having a plurality of subsystems operable at different frequencies, wherein the operating frequencies can be switched in real time.

Parts List

10 Master State Machine
12 Synchronizing State Machine
14 Synchronizing State Machine
16 Synchronizing State Machine
17 Clock Generator
18 Synchronizing State Machine
19 Bus Cycle Clock Logic
20 ASIC Bus Interface (ABI)
22 Read/Write Register
24 Read/Write Register
26 Read/Write Register
28 Clock Multiplexer Control Circuit

What is claimed is:

1. A bus interface device comprising:
a master state machine including a plurality of control input lines and a plurality of control output lines; three or more synchronizing state machines, each including a control input line coupled to one of the control output lines of the master state machine and at least one output select line; and clocking means for supplying a different clock frequency signal to each of the synchronizing state machines;

wherein said master state machine selectively enables the synchronizing state machines in response to control signals applied to the control input lines of the master state machine; and a plurality of subsystems operable at different clock frequencies, each subsystem including a control input line coupled to the output select line of a corresponding one of the synchronizing state machines, wherein the clocking means supplies the different clock frequency signal to each subsystem that corresponds to the different clock frequency signal supplied to the synchronizing state machine corresponding thereto.

2. A bus interface device as claimed in claim 1, further comprising clock frequency setting means for changing an operating frequency of at least one of the subsystems.

3. A bus interface device as claimed in claim 2, wherein the clock frequency setting means comprises a clock multiplexer control circuit including a control input coupled to a subsystem control register.

* * * * *